United States Patent [19]
Devitt et al.

[11] Patent Number: 5,069,915
[45] Date of Patent: Dec. 3, 1991

[54] COCOA BUTTER FRACTIONS

[75] Inventors: Michael T. Devitt, Doddinghurst; Mark Weyland, Sidcup, both of Great Britain

[73] Assignee: Van den Bergh Foods Co., Division of Conopco, Inc., Lisle, Ill.

[21] Appl. No.: 566,642

[22] Filed: Aug. 13, 1990

[30] Foreign Application Priority Data

Oct. 27, 1989 [GB] United Kingdom ............... 8924288

[51] Int. Cl.$^5$ .............................................. A23G 3/00
[52] U.S. Cl. .................................. 426/93; 260/412.8; 426/417; 426/601; 426/631
[58] Field of Search ............... 426/93, 417, 601, 631; 260/412.8

[56] References Cited

U.S. PATENT DOCUMENTS 4,594,259 6/1986 Baker et al. .................... 426/613

FOREIGN PATENT DOCUMENTS

| 0081881 | 6/1983 | European Pat. Off. . |
| 953451 | 3/1964 | United Kingdom . |
| 953452 | 3/1964 | United Kingdom . |
| 953453 | 3/1964 | United Kingdom . |
| 2168716 | 6/1986 | United Kingdom . |
| 2177107 | 1/1987 | United Kingdom . |

Primary Examiner—Donald E. Czaja
Assistant Examiner—Leslie Wood
Attorney, Agent, or Firm—Rimma Mitelman

[57] ABSTRACT

The invention concerns with fractions of cocoa butter, with specific N-profiles, which can be obtained by solvent fractionation of cocoa butter. The olein fraction and the stearin fraction to be obtained, can be blended with either natural cocoa butter, and/or butter fat and/or cocoa butter extender fat. The products can be used a.o. as chocolate filling, or as chocolate coating for frozen products.

25 Claims, No Drawings

COCOA BUTTER FRACTIONS

This invention relates to confectionary fats derived from cocoa butter by fractionation and to a fractionation process for deriving such fats.

It has already been proposed in GB 2 013 705 to fractionate animal or vegetable fats from acetone in two stages, first at 14° C. to 16° C. to recover a hard stearin fraction, the remaining olein fraction being refractionated at 4° to 6° C. to recover a second, semisolid stearin fraction and a liquid oil olein fraction, the process being applicable to cocoa butter but primarily concerned with the fractionation of palm oil and butter, the separated or combined stearin fractions of which may be blended with cocoa butter.

According to GB 2 177 107 such methods of simple fractionation are incapable of separating soft low quality cocoa butter cleanly into two phases respectively liquid and solid at ambient temperatures from 20° C. to 30° C. and a special method of fractionating soft low quality cocoa butter unsuitable for direct use in chocolate manufacture, from hexane at −10° C. to 0° C. is disclosed to recover a stearin fraction for use in confectionery by the removal of a fraction composed of liquid triglycerides and having an iodine value of at least 58, compared with acetone fractionation at 15° C. yielding an olein of iodine value 50. A second fractionation of the remaining olein fraction may be applied to recover a second stearin fraction at −10° C. to −5° C. The stearin fractions may be blended with directly useable or low quality cocoa butter or palm midfraction.

The present invention provides an olein fraction of cocoa butter suitable for use in confectionary and particularly for chocolate coatings in ice cream and frozen desserts. The invention therefore provides a cocoa butter fraction having a solids content which expressed by N value at 30° C. is less than 5 preferably less than 1.0 and a minimum of 40 at 20° C. with an iodine value range from 35 to 45. Solids content N values are determined by pulsed NMR (nuclear magnetic resonance) applied to the stabilised fat.

Such fractions may be characterised by the presence not only of di-unsaturated and tri-unsaturated triglycerides but also a proportion of 1,3-dipalmityl triglycerides preferably at least 25%, and a palmitic/oleic acid ratio above 0.7. In consequence they are not completely liquid at ambient temperature.

A fractionation process for the recovery of such olein fractions from cocoa butter should therefore be carried out which ensures that a proportion of POP remains in the olein fraction. The invention also provides a process for the recovery of such fractions in which cocoa butter is fractionated from an organic solvent, such as hexane or preferably acetone, preferably at a temperature wherein 25-45 wt % of the original cocoa butter is separated as the olein fraction from a remaining stearin fraction. The temperature used is in general between 16 and 30° C., preferably about 18° C. The preferred solvent: cocoa butter ratio is 6:1 to 8:1. The olein fraction which is separated comprises 25 to 45% of the cocoa butter, preferably about 40%. This olein fraction has a solids content at 30° C. which is less than 5.0 and a minimum of 40 at 20° C. with an iodine value range from 35 to 45. All parts in this specification are by weight.

Cocoa butter olein fractions made in accordance with the present invention can be used to soften hard cocoa butter to give a predetermined solids content. For example, a Malaysian cocoa butter with 10% added cocoa butter olein according to the present invention has a very similar solids content to a West African cocoa butter. To match Brazilian cocoa butter, which is softer, from 12% to 15% of the cocoa butter olein must be added to Malaysian cocoa butter. Therefore we prefer to add 5-75 wt %, in particular 12-15 wt % based on the cocoa butter of the cocoa butter olein fraction to a natural cocoa butter. In this way blends can be obtained with the following N-profile: $N_{20}=52-77$; $N_{25}=40-70$, $N_{30}=8.0-38$ and $N_{35}=0.0-0.8$. These compositions also can contain 15% to 25% of butter fat.

In this way a cocoa butter olein in accordance with the present invention can be used in partial replacement of cocoa butter and butter fat in milk chocolate compositions. Thus, a blend of 75 wt % cocoa butter with 25% butter fat is equivalent in hardness to 60 wt % of the cocoa butter with 15 wt % butter fat, balance cocoa butter olein according to the present invention. The invention therefore provides blends of cocoa butter olein with cocoa butter suitable for use in confectionery and comprising from 5% to 75% cocoa butter olein according to the invention with 25% to 15% of butter fat, balance cocoa butter.

The invention also provides a blend of 5% to 75% cocoa butter olein according to the invention balance cocoa butter. Such compositions exhibit improved solids content values compared with simple blends of the same amount of butter fat with cocoa butter.

Very useful compositions, with respect to their N-values are obtained by blending the cocoa butter olein fraction of the invention with butter, in general in the ratio 95-65 wt % olein: 5-35 wt % butterfat. These blends preferably contain 95-80 wt % cf the olein fraction. This way blends are obtained, that display the following N-profile: $N_{20}=8.0-46$, $N_{25}=5.0-32$ and $N_{30}=$ less than 2.0.

The cocoa butter olein fractions of the present invention may also be used as the principal fat component in confectionery compositions for chocolate fillings and in particular, as a basis for chocolate coating fat for frozen desserts such as ice cream. Surprisingly such coating fats exhibit advantage over the use of cocoa butter itself in this application, where weight control and appearance are important factors. A substantially lower pick up weight compared with cocoa butter is observed in dipping methods for applying these coatings, without sacrificing setting time, the coated product exhibiting good appearance and gloss and with a smooth finish.

The effect of the fractionation process according to the present invention is to concentrate substantially all the di- and tri-unsaturated triglycerides in the olein fraction, which also includes a proportion of the lower melting symmetrical triglycerides of cocoa butter, i.e. 2-oleyl dipalmityl, and 2-linoleyl disaturated triglycerides.

The residual stearin fraction which may be recovered in accordance with the present invention is substantially free from di-unsaturated triglycerides. In addition it contains more of the higher-melting symmetrical disaturated triglycerides e.g. StOSt, POSt than the parent cocoa butter, but less POP than stearin fractions obtained by processes hitherto. These are directed to producing a harder fraction than the parent cocoa butter, by fractionation principally to remove di-unsaturated and tri-unsaturated triglycerides in a liquid olein fraction. The stearin fractions obtained by the fractionation process are characterised by an $N_{40}$ value of less than 2.0, in particular less than 0.5, an $N_{35}$ value of 5-25, in particular 8-20, an $N_{30}$ value of 60-93, in particular 65-90, an $N_{25}$ value of 80-95, in particular 83-93 and an $N_{20}$ value of more than 83, in particular more than 87. The 1,3-gipalmitry triglyceride content of this fraction is 2.0-15.0 wt % and the combined 1-palmityl-3-stearyl-triglyceride and 1,3-distearyltriglyceride content is 60-95 wt %. These stearin fractions may be used with cocoa butter extender fat compositions comprising or consisting of palm mid fractions. The present invention therefore provides fat compositions suitable for replacing at least part of the cocoa butter normally used in confectionery fats and comprising a blend of the cocoa butter stearin with a palm mid fraction, in which the cocoa butter stearin consists substantially of symmetrical disaturated triglycerides free from triglycerides containing more than one double bond and a limited proportion only of the POP originally present in the cocoa butter, i.e. the fraction mentioned above. In these blends of stearin fraction and CBE the weight ratio of the two components is 20-90 wt % stearin fraction to 80-10 wt % CBE. This way blends with the following N-profile can be obtained: $N_{20}=75-95$, $N_{25}=60-83$, $N_{30}=3-50$ and $N_{35}=$ less than 4.0.

The palm mid fraction may be prepared as described in our British Patent 927805. Additional vegetable butters and their fractions may also be present, for example shea fat and its stearin fractions, illipe fat and sal fat (shorea robusta) and its stearin fractions, in accordance with this patent specification. Useful compositions are also obtained by blending of the cocoa butter stearin fractions of the invention with natural cocoa butter. The blends preferably consist of 70-10 wt % stearin and 30-90 wt % natural cocoa butter. In this way blends with the following N-profile can be obtained: $N_{20}=70-95$; $N_{25}=65-92$, $N_{30}=41-70$ and $N_{35}=0.6-4.2$.

Other useful compositions consist of the olein fraction of the invention and a cocoa butter extender, preferably the same palm mid fraction mentioned above, wherein the weight ratio is 30-70 wt % of the olein fraction and 70-30 wt % of the CBE. A blend hereof displays the following N-values: $N_{20}=52-68$, $N_{25}=34-42$; $N_{30}=$ less than 0.5.

EXAMPLE 1

Refined West African cocoa butter was fractionated from acetone at 16.5° C. in an acetone:oil ratio of 7:1 to recover stearin in 60% yield and olein fraction. These were analysed as shown in Table 1, from which it can be seen that the olein fraction contains a substantial amount of POP.

Chocolate fillings based on cocoa butter were made from equal parts of a fat blend according to the invention and a mixture of additional ingredients composed of 60% sugar and 20% each of skimmed milk powder and 10/12 cocoa powder. 0.4% lecithin was included in the total composition. Fat blends were prepared from 10%, 20%, 30% and 40% butter fat, balance the above cocoa butter olein prepared in accordance with the invention.

The fillings were tempered to avoid the formation of graininess in the product. Cups filled with these products and stored at 20° C. exhibited no post-hardening after 8 weeks, during which penetration values of the samples in the order above ranged from 47.5 to 49.5; 61 to 67.5; 90.7 to 94 and 124.7 to 129.5.

All the samples were found satisfactory as chocolate fillings in comparison with a standard chocolate filling fat blend with good characteristics.

EXAMPLE 2

Ice cream blocks were coated by dipping using a coating composition prepared according to the following recipe:
Sucrose 41.0%
Cocoa Mass 12.0%
Cocoa butter olein 27.5%
Full cream milk powder 14.2%
Butter fat 5.0%
Lecithin 0.3%

The temperature of the coating was 46° C. and the setting time and pick up weight were measured and the appearance of the coating examined, in comparison with a control test in which the olein was replaced in the formulation by the same weight of cocoa butter. Results appear in Table 2.

TABLE 1

| Triglyceride Group | | W.Afr.CB | CB st | CB Oleine |
|---|---|---|---|---|
| C 50 | PPS | 0.7 | 0.7 | 1.0 |
|  | POP | 16.0 | 10.7 | 27.9 |
|  | PLnP | 1.7 | 0.2 | 5.7 |
| C 52 | PSS | 1.2 | 1.9 | 0.2 |
|  | POS | 38.7 | 43.4 | 32.1 |
|  | POO | 2.2 | 0.6 | 5.8 |
|  | PLnS | 3.5 | 1.1 | 7.3 |
|  | PLnO | 0.4 | 0.0 | 0.6 |
| C 54 | SSS | 0.4 | 1.3 | 0.0 |
|  | SOS | 28.8 | 37.2 | 7.8 |
|  | SOO | 2.9 | 0.0 | 6.3 |
|  | SLnS/000 | 2.0 | 1.2 | 4.0 |
|  | SLnLn | 0.3 | 0.0 | 1.1 |
| C 56 | AOS | 1.2 | 1.6 | 0.3 |
|  | IV | 38.0 | 33.0 | 43.0 |
| POP + POS + SOS | | 83.5 | 91.3 | 67.7 |

S = Stearic Acid
P = Palmitic Acid
O = Oleic Acid
Ln = Linoleic Acid
A = Arachidic Acid

TABLE 2

| Test | Olein | Cocoa butter |
|---|---|---|
| Setting times (secs) | 57 | 72 |
| Pick up weight (g) | 20.7 | 27.7 |
| Fracture | Clean cut no fracture | None (soft) |
| Appearance | Good, good gloss | Good appearance dull |

These results show an improvement over the cocoa butter product.

EXAMPLE 3

Brazilian cocoa butter was fractionated at 12° C. as a control and at 18° C. in accordance with the invention, from acetone in a 7:1 acetone:oil ratio. The stearin fractions recovered were blended with the parent cocoa butter in a 70:30 cocoa butter:stearin ratio. In Table 3 the solid content of these compositions is compared with that of West African cocoa butter by NMR determination at temperatures from 20° C. to 40° C. In Table 4 the triglyceride composition of the two stearin fractions is compared with that of the parent cocoa butter.

It will be seen from Table 3 that when these two stearins were blended with the parent cocoa butter, both stearins elevate the solids content of the cocoa butter below 40° C., but that the 18° C. fraction produces a blend more nearly approximating to the solids content of West African cocoa butter.

TABLE 3

|   | N20 | N25 | N30 | N32.5 | N35 | N40 |
|---|---|---|---|---|---|---|
| A Brazilian CB | 63.5 | 55.8 | 27.7 | 6.0 | 0.4 | 0.0 |
| B Bz CBs (12C) | 81.1 | 77.7 | 52.2 | 19.6 | 2.2 | 0.0 |
| C Bz CBs (18C) | 93.1 | 91.5 | 88.3 | 53.0 | 18.4 | 0.0 |
| D 70 BzCB:30CBs(12) | 69.4 | 62.3 | 35.2 | 9.4 | 0.1 | 0.0 |
| E 70BzCB:30CBs(18) | 73.5 | 66.9 | 47.0 | 15.2 | 1.0 | 0.0 |
| F W.African CB | 76.2 | 70.0 | 49.4 | 13.4 | 0.7 | 0.0 |

TABLE 4

|   | POP | PLnP | POSt | POO | PLnSt | StOSt | StOO |
|---|---|---|---|---|---|---|---|
| A Bz CB | 15.4 | 1.9 | 36.6 | 5.0 | 3.3 | 23.4 | 6.5 |
| B CBs 12 | 15.5 | 1.0 | 41.2 | 2.2 | 2.4 | 27.7 | 2.4 |
| C CBs 18 | 4.0 | 0.1 | 32.8 | 0.2 | 1.1 | 51.1 | 0.0 |

EXAMPLE 4

The fractionation according to example 1 was repeated, using an acetone: fat ratio of 6:1 and starting from different sources of cocoa butter. The results are given in table 5 for the yields of stearin fraction mentioned.

TABLE 5

| From CB | West African | Malaysian | Brazilian |
|---|---|---|---|
| N20 | 95.0 | 94.2 | 87.5 |
| N25 | 91.2 | 93.2 | 83.1 |
| N30 | 73.3 | 89.1 | 66.9 |
| N32.5 | 44.1 | 63.0 | 35.7 |
| N35 | 15.9 | 19.2 | 8.6 |
| N40 | 0.0 | 0.0 | 0.0 |
| Yield | 60% | 70% | 70% |
| IV | 30.4 | 29.9 | 31.0 |

| Symmetrical monounsaturated content (SOS) | | |
|---|---|---|
| POP | POST | STOST |
| 10.7 | 43.4 | 37.2 |

EXAMPLE 5

A cocoa butter stearin fraction with the N-profile mentioned in table 6, which was obtained by fractionation of a cocoa butter and which had the N-profile of table 6, was mixed with different amounts of palm mid fractions (50, 60 and 70%). The N-profiles of the blends are mentioned in table 6. These results show, that the mixtures have properties which are quite close to those of the cocoa butter.

TABLE 6

|   | CBst | +50% PMF | +60% PMF | +70% PMF | CB |
|---|---|---|---|---|---|
| N20 | 89.1 | 78.6 | 79.2 | 81.1 | 76.2 |
| N25 | 86.5 | 63.8 | 62.4 | 64.3 | 70.0 |
| N30 | 74.3 | 29.9 | 25.7 | 24.1 | 49.4 |
| N32.5 | 36.1 | 0.9 | 1.2 | 0.5 | 13.4 |
| N35 | 5.2 | 0.0 | 0.5 | 0.1 | 0.7 |
| N40 | 1.1 | 0.0 | 0.0 | 0.0 | 0.0 |

EXAMPLE 6

Ice-lollies were dipped by using a coating composition, according to the recipe of table 7. The particulars of the materials and of the process are also mentioned in table 7. The results show that in a very short setting time (42 sec) a good pick-up weight could be achieved.

TABLE 7

| Ice cream coatings with CBf as only fat component | | |
|---|---|---|
| CBf analysis | Recipe | Ice-lolly dipping test |
| N20 48.3 | Sugar 41.1% | Setting time 42 secs |
| N25 36.0 | Cocoa Powder 5.4% | Pick up weight 29.5 g |
| N30 0.0 | CB oleine 42.6% | |
| N32.5 0.0 | Skim milk 10.6% | Hardness 69 |
| (stab. 40 hrs at 20° C.) | powder | (by Stevens penetrometer) |
| IV 43.8 | Lecithin 0.2% | Dipping 30° C. temperature |

EXAMPLE 7

Blends were made of cocoa butter olein with the N-profile of table 8 with different amounts of butter fat (10–30 wt %).

The blends displayed the N-profile of table 8.

TABLE 8

| Blends of CBf and Butterfat Stabilised 40 hrs at 20° C. | | | | |
|---|---|---|---|---|
|   | CBf | +10% Bu | +20% Bu | +30% Bu |
| N20 | 48.3 | 44.8 | 33.5 | 10.0 |
| N25 | 36.0 | 29.5 | 20.1 | 6.2 |
| N27.5 | 15.8 | 7.8 | 4.2 | 3.9 |
| N30 | 0.0 | 0.2 | 0.7 | 0.9 |

EXAMPLE 8

A blend was made of cocoa butter and cocoa butter olein in a weight ratio 4/1.

This blend was used as a milk chocolate coating in a recipe according to table 9. The results were compared with a coating of cocoa butter only. From the results it can be concluded, that the CB-olein reduces the yield value and viscosity of tempered chocolate, while not making the products softer by penetration.

TABLE 9

| Normal Milk chocolate coating with CBf (and CB) | | |
|---|---|---|
|   | 30% fat | |
| Recipe | 4/1 CB/CBf | CB |
| % Cocoa Powder | 6 | 6 |
| % Skim milk powder | 18 | 18 |
| % Sugar | 46 | 16 |
| % CB | 19.9 | 24.9 |
| % CB oleine | 5.0 | — |
| % Butterfat | 4.5 | 4.5 |
| % Lecithin | 0.4 | 0.4 |
| Demoulding time (mins) | 22 | 21 |
| Yield value (Pa) | 21 | 29 |
| Hardness by Penetration | | |
| after 5 weeks  20° C. | 18 | 15 |
| 25° C. | 33 | 46 |
| Viscosity due to Tempering (PaS) | 5.5 | 8 |

EXAMPLE 9

The blends according to table 10 were made. These blends displayed the N-profile of this same table.

TABLE 10

| Blends of West African cocoa butter and cocoa butter olein | | | | | |
|---|---|---|---|---|---|
| W.A.-CB | CB olein | $N_{20}$ | $N_{25}$ | $N_{30}$ | $N_{35}$ |
| 90 | 10 | 75.8 | 67.1 | 35.4 | 0.6 |
| 70 | 30 | 68.9 | 59.0 | 26.7 | 0.5 |

TABLE 10-continued

Blends of West African cocoa butter and cocoa butter olein

| W.A.-CB | CB olein | $N_{20}$ | $N_{25}$ | $N_{30}$ | $N_{35}$ |
|---|---|---|---|---|---|
| 50 | 50 | 61.9 | 51.0 | 17.9 | 0.3 |
| 30 | 70 | 54.9 | 42.8 | 9.1 | 0.0 |

EXAMPLE 10

The blends according to table 11 were made. The N-profiles of the blends are mentioned in table 11.

TABLE 11

Blends of West African cocoa butter and cocoa butter stearin.

| W.A.-CB | CB stearin | $N_{20}$ | $N_{25}$ | $N_{30}$ | $N_{35}$ |
|---|---|---|---|---|---|
| 90 | 10 | 81.3 | 73.8 | 43.9 | 1.1 |
| 70 | 30 | 85.3 | 79.1 | 52.1 | 2.1 |
| 50 | 50 | 87.3 | 84.3 | 60.2 | 3.0 |
| 30 | 70 | 93.3 | 89.6 | 68.4 | 3.9 |

EXAMPLE 11

Blends were made of cocoa butter olein and a palm mid fraction. The N-values of the blends are mentioned in table 12.

TABLE 12

Blends of cocoa butter olein and palm mid fraction.

| CB-olein | PMF | $N_{20}$ | $N_{25}$ | $N_{30}$ |
|---|---|---|---|---|
| 70 | 30 | 53.7 | 35.1 | 0 |
| 50 | 50 | 59.8 | 38.0 | 0 |
| 30 | 70 | 66.0 | 41.0 | 0 |

EXAMPLE 12

Blends were made of cocoa butter stearin and palm mid fraction. These blends displayed the N-profile of table 13.

TABLE 13

| CB stearin | PMF | $N_{20}$ | $N_{25}$ | $N_{30}$ | $N_{35}$ |
|---|---|---|---|---|---|
| 70 | 30 | 92.1 | 81.9 | 47.6 | 3.5 |
| 50 | 50 | 87.2 | 71.5 | 25.5 | 2.2 |
| 30 | 70 | 82.4 | 61.0 | 3.3 | 0 |

EXAMPLE 13

Blends were made of West African cocoa butter, cocoa butter stearin and palm mid fraction, according to table 14. These blends possessed the N-profiles of table 14.

TABLE 14

| W.A.-CB | CB stearin | PMF | $N_{20}$ | $N_{25}$ | $N_{30}$ | $N_{35}$ |
|---|---|---|---|---|---|---|
| 90 | 5 | 5 | 80.1 | 71.2 | 33.4 | 0.8 |
| 80 | 5 | 15 | 79.7 | 68.6 | 34.1 | 0.7 |
| 80 | 10 | 10 | 80.9 | 71.2 | 36.9 | 1.0 |
| 80 | 15 | 5 | 82.1 | 73.8 | 42.5 | 1.3 |

EXAMPLE 14

Blends were made with the composition mentioned in table 15. These blends displayed the N-profiles mentioned in the table.

TABLE 15

| W.A.-CB | CB olein | PMF | $N_{20}$ | $N_{25}$ | $N_{30}$ | $N_{35}$ |
|---|---|---|---|---|---|---|
| 90 | 5 | 5 | 77.3 | 67.9 | 34.1 | 0.6 |
| 80 | 5 | 15 | 76.9 | 65.3 | 27.2 | 0.4 |
| 80 | 10 | 10 | 75.4 | 64.6 | 28.5 | 0.5 |
| 80 | 15 | 5 | 73.9 | 63.8 | 29.7 | 0.5 |

We claim:

1. Cocoa butter olein fraction, characterised by an $N_{30}$ value of less than 5, an $N_{20}$ value of at least 40, an iodine value of 35–45 and the presence of at least 25 wt % 1,3-dipalmityl triglycerides.

2. Fraction according to claim 1, characterised by an $N_{30}$ value of less than 1.0.

3. Cocoa butter stearin fraction, characterised by an $N_{40}$ value of less than 2.0, an $N_{35}$ value of 5–25, an $N_{30}$ value of 60–93, an $N_{25}$ value of 80–95, an $N_{20}$ value of more than 83, a 1,3-dipalmityl triglyceride content of 2.0–15.0 wt % and a content of combined 1-palmityl-3-stearyl triglyceride and 1,3-distearyl trigylcerides of 60–95 wt %.

4. Fraction according to claim 3, characterised by an $N_{40}$ of less than 0.5, an $N_{35}$ of 8–20, an $N_{30}$ of 65–90, an $N_{25}$ of 83–93 and an $N_{20}$ of more than 87.

5. Single stage solvent fractionation process of cocoa butter wherein the fractionation is carried out at a temperature of 16°–30° C. with an organic solvent, the weight ratio of the organic solvent to the cocoa butter being from 6:1 to 8:1, wherein 25–45 wt % of the original cocoa butter is separated as the olein fraction in claim 1.

6. Process according to claim 5, wherein the organic solvent is selected from the group consisting of acetone and hexane.

7. Composition comprising cocoa butter and 5–75 wt % based on the cocoa butter amount of the cocoa butter olein fraction of claim 1.

8. Composition according to claim 7, characterised by an $N_{20}$ value of 52–77, an $N_{25}$ value of 40–70, and $N_{30}$ value of 8.0–38 and an $N_{35}$ value of 0.0–0.8.

9. Composition according to claim 7, comprising also 15–25 wt % butter fat, based on combined cocoa butter and cocoa butter olein.

10. Composition comprising 70–10 wt % of the cocoa butter stearin of claim 3 and 30–90 wt % of natural cocoa butter.

11. Composition according to claim 10, characterised by an $N_{20}$ value of 70–95, an $N_{25}$ value of 65–92, an $N_{30}$ value of 41–70 and an $N_{35}$ value of 0.6–4.2.

12. Composition, comprising butter fat and the cocoa butter olein fraction of claim 1 in the ratio of 5–35 wt % butter fat and 95–65 wt % of the olein fraction.

13. Composition according to claim 12 comprising 95–80 wt % of the olein fraction.

14. Composition according to claim 12 wherein the mixture displays an $N_{20}=8.0$–46, and $N_{25}=5.0$–32 and an $N_{30}$ of less than 2.0.

15. Composition, comprising the stearin fraction of claim 3 and a cocoa butter extender fat in a weight ration of 20–90 wt % stearin fraction to 80–10 wt % cocoa butter extender.

16. Composition according to claim 15 wherein the cocoa butter extender is a palm mid fraction.

17. Composition according to claim 15, wherein the mixture displays an $N_{20}=75$–95, and $N_{25}=60$–83, an $N_{30}=3$–50, and $N_{35}$ less than 4.0.

18. Composition comprising the olein fraction of claim 1 and a cocoa butter extender in a weight ratio of 30–70 wt % olein fraction and 70–30 wt % cocoa butter extender.

19. Composition according to claim 18, wherein the cocoa butter extender is a palm mid fraction.

20. Composition according to claim 18, characterised by an $N_{20}$ value of 52–68, an $N_{25}$ value of 34–42, an $N_{30}$ value of less than 0.5.

21. Chocolate filling, comprising 30–60 wt % of a fat, that includes 80–100 wt % of the olein fraction of claim 1.

22. Filled chocolates, containing as a filling the chocolate filling of claim 21.

23. Chocolate coating for frozen food products, comprising 30–60 wt % of a fat, that includes 80–100 wt % of the olein fraction of claim 1.

24. Frozen food products, provided with a chocolate coating, wherein the coating is the chocolate coating of claim 23.

25. Composition according to claim 7 wherein the content of the cocoa butter olein fraction of claim 1 is 12–15 wt % based on the cocoa butter amount.

* * * * *